(12) United States Patent
Guo et al.

(10) Patent No.: US 8,650,293 B2
(45) Date of Patent: Feb. 11, 2014

(54) THRESHOLD-BASED NORMALIZED RATE EARLIEST DELIVERY FIRST (NREDF) FOR DELAYED DOWN-LOADING SERVICES

(75) Inventors: Yang Guo, Plainsboro, NJ (US); Jun Li, Plainsboro, NJ (US); Kumar Ramaswamy, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 167 days.

(21) Appl. No.: 12/226,964

(22) PCT Filed: May 5, 2006

(86) PCT No.: PCT/US2006/017267
§ 371 (c)(1),
(2), (4) Date: Nov. 3, 2008

(87) PCT Pub. No.: WO2007/130038
PCT Pub. Date: Nov. 15, 2007

(65) Prior Publication Data
US 2009/0113054 A1    Apr. 30, 2009

(51) Int. Cl.
*G06F 15/173* (2006.01)
*G06F 13/368* (2006.01)
*H04L 12/26* (2006.01)

(52) U.S. Cl.
USPC .......................... 709/225; 710/123; 370/252

(58) Field of Classification Search
USPC ........................................ 709/225, 203, 217
See application file for complete search history.

(56) References Cited

U.S. PATENT DOCUMENTS

| | | | |
|---|---|---|---|
| 5,923,875 A | 7/1999 | Tabuchi | |
| 6,003,082 A | 12/1999 | Gampper et al. | |
| 2002/0062372 A1 | 5/2002 | Hong et al. | |
| 2003/0156547 A1* | 8/2003 | Peleg | 370/252 |
| 2003/0217113 A1 | 11/2003 | Katz et al. | |
| 2004/0001493 A1* | 1/2004 | Cloonan et al. | 370/395.42 |
| 2005/0138626 A1* | 6/2005 | Nagami et al. | 718/105 |
| 2006/0080486 A1* | 4/2006 | Yan | 710/123 |
| 2006/0161641 A1* | 7/2006 | Sekiguchi et al. | 709/219 |

FOREIGN PATENT DOCUMENTS

| | | |
|---|---|---|
| JP | 9128338 | 5/1997 |
| WO | WO03085924 | 10/2003 |

OTHER PUBLICATIONS

International Search Report, dated Feb. 19, 2007.

* cited by examiner

*Primary Examiner* — John Follansbee
*Assistant Examiner* — Alan S Chou
(74) *Attorney, Agent, or Firm* — Robert D. Shedd; Joseph J. Opalach

(57) ABSTRACT

A content delivery system comprises at least one content server that servers a number of client requests. The content server uses a Threshold-Based Normalized Rate Earliest Delivery First (TB-NREDF) scheduler. The TB-NREDF scheduler imposes a threshold value, or limit, on the number of rescheduling requests.

15 Claims, 13 Drawing Sheets

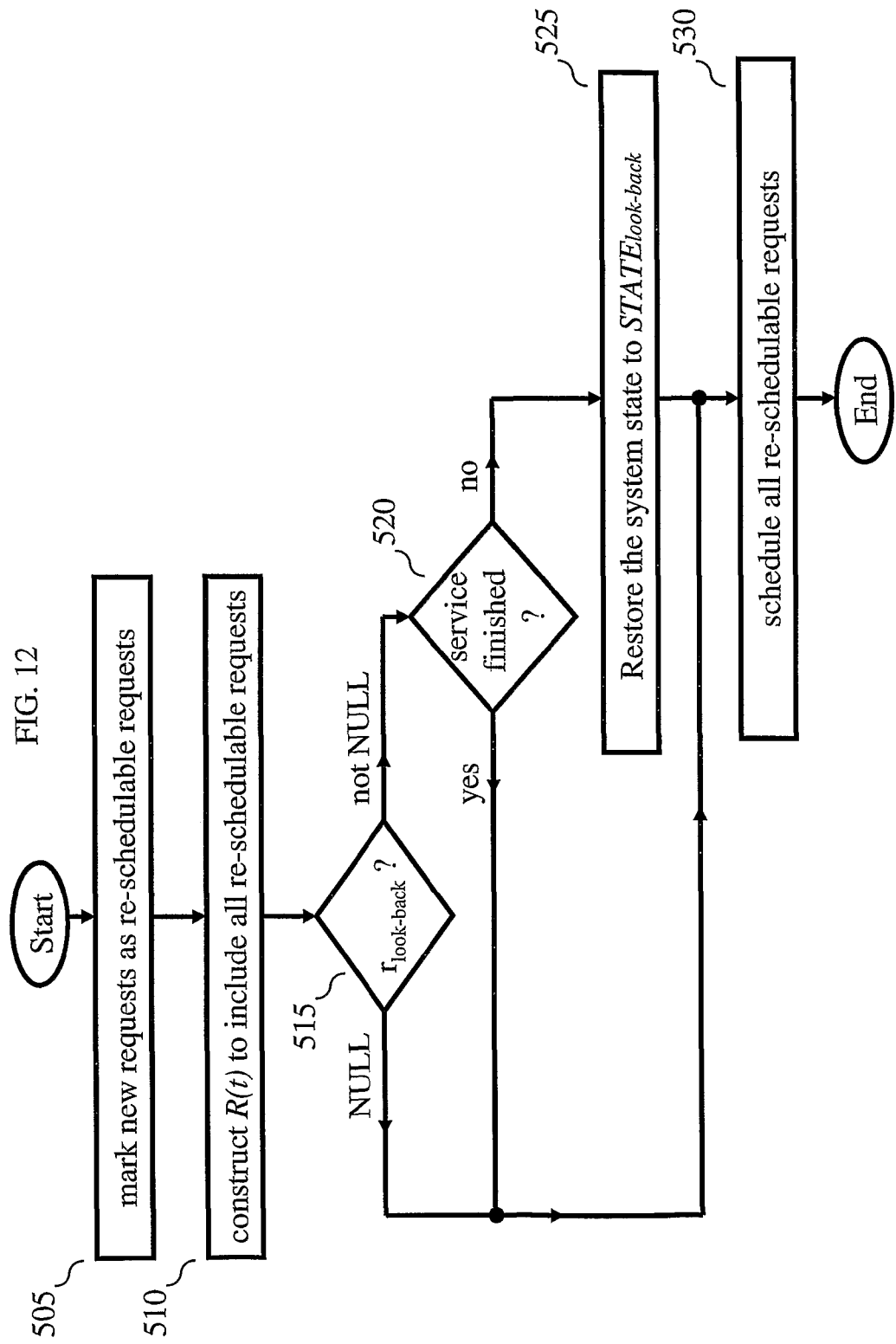

FIG. 13

Pseudo-code

1. Mark new requests as *re-schedulable* requests
2. Construct $R(t)$ that includes all re-schedulable requests
3. If $r_{look-back}$ is *not* NULL && *not* finished
4.    Restore the system state to $STATE_{look-back}$;
5. Sort the request set $R(t)$ in the descending order of normalized rate
6. For ($q=1$ to $Q$, $q++$); $Q$ is the number of total requests in $R(t)$.
7.    For request $r_q = (m_q, d_q, u_q)$, find the shortest path that provides the minimum schedule time of the content $m_q$ to $u_q$, through the following procedure:
8.       Starting from a set of servers $H_q$, in which each server $i$ has $m_q \in M_i(t_i)$, a source of content $m_q$ for request $r_q$, where $t_i = max[s_p(j,i), p<q]$, the last time cache on server $i$ got updated
9.       Using a multi-source shortest path algorithm (e.g., Dijkstra's algorithm) to find the shortest path from any server $i \in H_q$ to $u_q$.
10.       Find the schedule $\{s_q(j,k), (j,k) \in L\}$ and update cache $\{M_i(t), i \in N\}$ for links and servers on the shortest path, respectively, applying constraints on link capacity and cache capacity.
11.    If $max[s_q(j,k), (j,k) \in L] > d_q$ reject this request
12.    Else if $((Q > T)$ & $(q \leq (Q-T)))$
13.       $r_{look-back} = r_q$
14.       Mark $r_{look-back}$ as *non re-schedulable* request
15.       $STATE_{look-back}$ = current state;
16.    Continue to next request, step 6.

ize Rate Earliest Delivery First (NREDF) scheduler limits
THRESHOLD-BASED NORMALIZED RATE EARLIEST DELIVERY FIRST (NREDF) FOR DELAYED DOWN-LOADING SERVICES This application claims the benefit, under 35 U.S.C. §365 of International Application PCT/US2006/017267 filed May 5, 2006, which was published in accordance with PCT Article 21(2) on Nov. 15, 2007 in English.

BACKGROUND OF THE INVENTION

The present invention generally relates to communications systems and, more particularly, to content delivery and distribution networks and components thereof, e.g., a content server, etc.

In a content delivery system, a content server may distribute different types of content, e.g., files, streaming video, etc., to different clients via a distributed communication network such as the Internet. Typically, this process is started by each client sending a request for particular content to the content server. As each request is received, the content server schedules delivery of the requested content to the requesting client, via the distributed communications network.

One approach for scheduling delivery of content to a client (or user) via a distributed communications network is the "Normalized Rate Earliest Delivery First" (NREDF) approach (also sometimes referred to in shorter form as "NRED"). In this approach, the content server computes a normalized rate for the delivery of particular content using an estimated "shortest path" between the content server and each requesting client. The "shortest path" is that path through the distributed communications network that provides the earliest delivery time of the requested content to the requesting client. As part of this process, the content server may identify other servers in the network that can source the requested content for delivery. The content server then schedules delivery of all the received client requests in the descending order of their associated computed normalized rates. As such, a requesting client with a higher computed normalized rate is scheduled for delivery before a requesting client with a lower computed normalized rate. However, new client requests may continue to arrive even after the content delivery server has just finished scheduling the previously received (or old) client requests. In this situation, as new client requests arrive those unfinished old client requests are rescheduled together with any new client requests in order to maximize the number of requests that can be served by the content server.

Unfortunately, as the client request rate increases, the content server begins to spend more and more time just computing the normalized rates and rescheduling old requests instead of actually delivering content. This behavior jeopardizes the scalability of the NREDF approach for serving large numbers of clients.

SUMMARY OF THE INVENTION

We have observed that a content server using a Normalized Rate Earliest Delivery First (NREDF) scheduler does not scale well as the client request rate increases since the computation overhead to reschedule old requests in admitting new requests also increases. Therefore, and in accordance with the principles of the invention, a content server using a Normalized Rate Earliest Delivery First (NREDF) scheduler limits the number of old requests that are rescheduled to a threshold value.

In an illustrative embodiment of the invention, a content delivery system comprises at least one content server that serves a number of client requests. The content server uses a Threshold-Based Normalized Rate Earliest Delivery First (TB-NREDF) scheduler. The TB-NREDF scheduler imposes a threshold value, or limit, on the number of rescheduling requests. Thus, the content server has the ability to limit rescheduling overhead, which also allows the content server to tradeoff scalability against system performance.

In another illustrative embodiment of the invention, the Threshold-Based Normalized Rate Earliest Delivery First (TB-NREDF) approach defines a look-back threshold, T, which represents the maximum number of old requests that are going to be rescheduled. For example, let R(t) denote a request set that includes any un-finished old client requests at a time t, together with any new client requests that arrive at the time t. Let Q be the total number of requests in R(t) and K represent the total number of old requests in R(t). The TB-NREDF approach reschedules at most T old requests, where T<K<Q. Thus, the schedules for the remaining K-T old requests are unchanged.

BRIEF DESCRIPTION OF THE DRAWINGS

FIGS. 11-13 show another illustrative embodiment for use in a content server in accordance with the principles of the invention.

DETAILED DESCRIPTION

Other than the inventive concept, the elements shown in the figures are well known and will not be described in detail. Also, familiarity with networking (and protocols used therein) is assumed and not described in detail herein. For example, other than the inventive concept, familiarity with the Internet Protocol (IP), Real-time Transport Protocol (RTP), and the Transmission Control Protocol (TCP) is assumed. Likewise, other than the inventive concept, familiarity with network components such as servers, edge nodes and clients is assumed. Similarly, other than the inventive concept, formatting and encoding methods such as Moving Picture Expert Group (MPEG)-2 Systems Standard (ISO/IEC 13818-1) and H.264: International Telecommunication Union, "Recommendation ITU-T H.264: Advanced Video Coding for Generic Audiovisual Services," *ITU-T,* 2003, for generating bit streams are well-known and not described herein. In this regard, it should be noted that only that portion of the inventive concept that is different from known server/client systems is described below and shown in the figures. It should also be noted that the inventive concept may be implemented using conventional programming techniques, which, as such, will also not be described herein. Finally, like-numbers on the figures represent similar elements.

Figure 1:
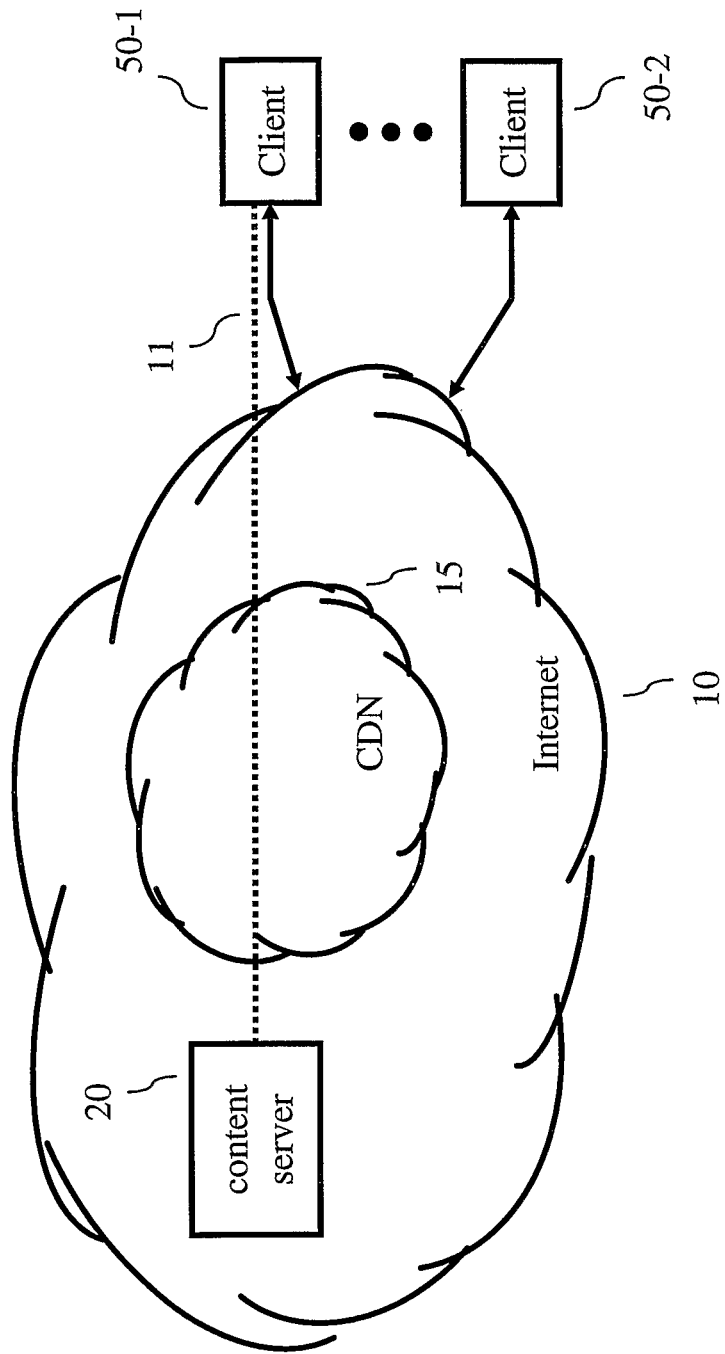
FIGS. 1-6 illustrate a prior art content delivery system using a normalized rate earliest delivery first scheduling process.

Before describing the inventive concept, a brief description of the Normalized Rate Earliest Delivery First (NREDF) scheduling process will first be provided. In this regard, a content delivery system using the NREDF scheduling process is shown in FIG. 1. The content delivery system comprises a content server 20, a communications network 10 and one or more clients, as represented by client 50-1 and 50-2. Content server 20, client 50-1 and client 50-2 are representative of stored-program-control-based processor platforms. For example, client 50-1 may be a desktop microprocessor-based personal computer and client 50-2 may be a cellular telephone; while content server 20 is a multi-processor-based (high performance) server. Illustratively, communications network 10 is representative of the Internet and comprises both switched and non-switched facilities as known in the art and includes, e.g., routers, edge node devices, etc. (all not shown in FIG. 1). In this example, and as can be observed from FIG. 1, content server 20 is represented as being located somewhere on the Internet with an associated Internet Protocol (IP) address (not shown). In addition, and as illustrated in FIG. 1, communications network 10 may also comprise a content delivery network (CDN) 15. As known in the art, a CDN is an overlay network (public or private) designed to securely deliver content from content servers (providers) to clients, while reducing costs and increasing client (end-user) speeds. As such, other servers in the CDN may also be able to source requested content under the control of content server 20. The format of this content may be static content (e.g., web site content, files) or dynamic content (i.e., quickly changing content) and/or streaming audio/video. In the context of FIG. 1, clients 50-1 and 50-2 send requests for content to content server 20. In response to these requests, content server 20 schedules delivery using the NREDF scheduling process and delivers, or sends, the requested content to the respective client via a path through the communications network. For example, content, e.g., a file, requested by client 50-1 is provided to client 50-1 via illustrative path 11, which, in this example, also traverses CDN 15. Path 11 represents any facilities and devices of communications network 10 through with the requested content is conveyed to client 50-1.

Figure 2:
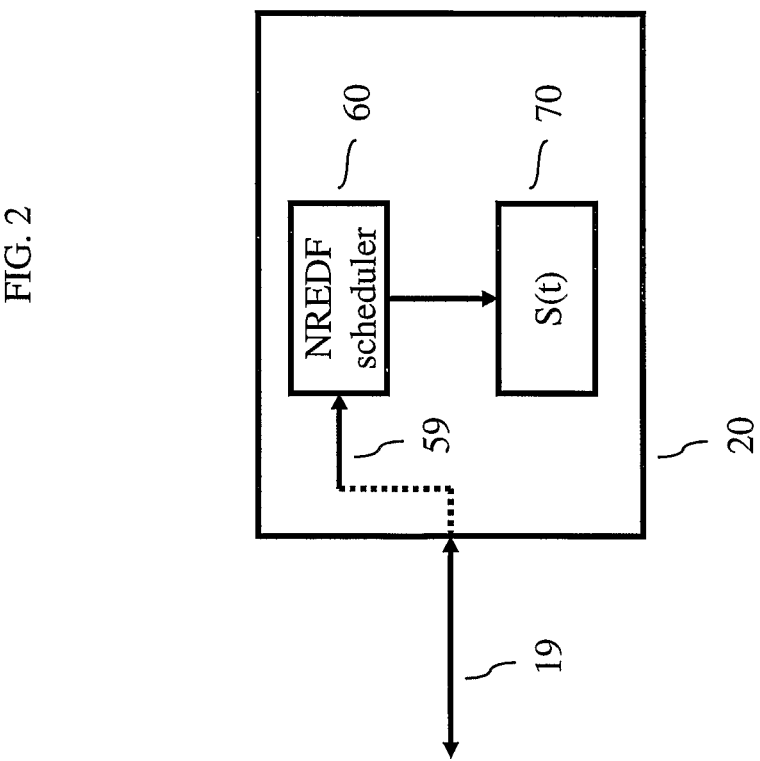
Figure 3:
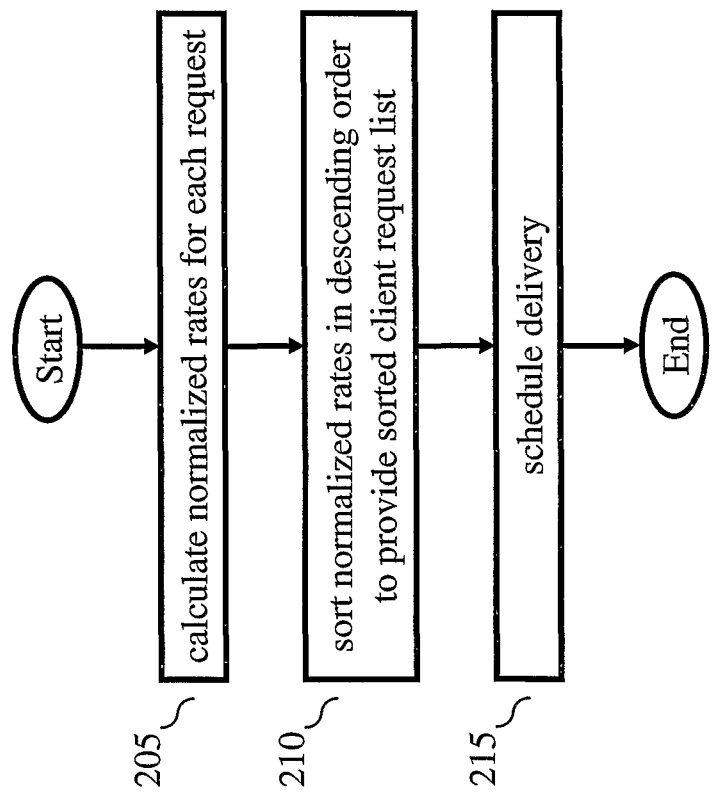
Figure 4:
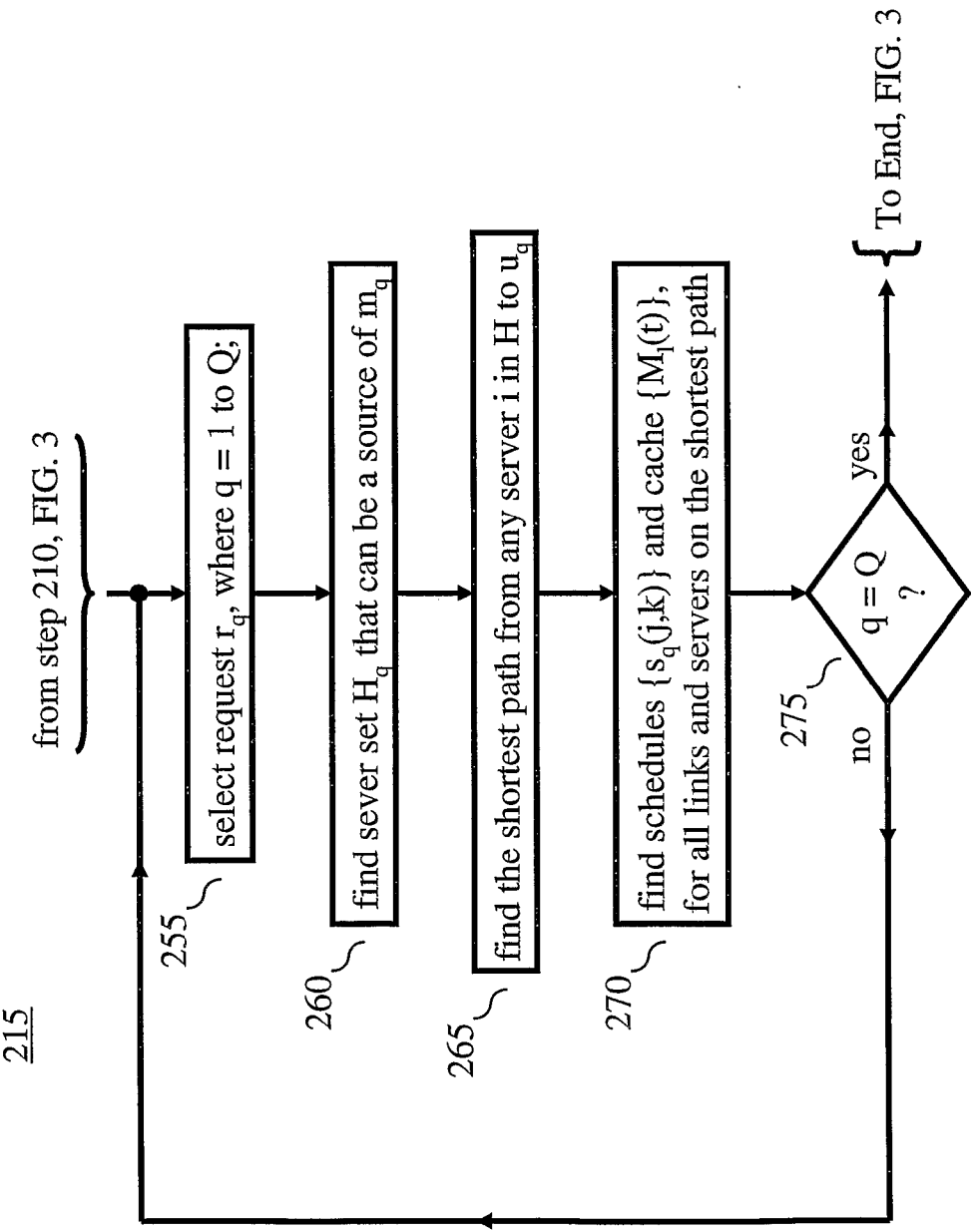

Turning now to FIG. 2, a high-level block diagram of content server 20 is shown. Content server 20 receives client requests 59 via connection 19, which couples content server 20 to Internet 10. Content server 20 comprises an NREDF scheduler 60, which processes the received client requests 59 and generates a scheduling set, S(t), 70, for providing the requested content to the requesting clients. An illustrative flow chart representing an NREDF scheduling process for use by content server 20 is shown in FIGS. 3 and 4. For the NREDF scheduling process, the following definitions are used:

N={$n_j$, j=0, . . . , J}—is the network node set, which includes one content server (j=0), I edge servers (j=1, . . . , I) and U clients (j=I+1, . . . , I+U=J);

$c_i(t)$—is the caching capacity at the j-th node, which is a time varying function;

$C_i(t)$—is the set of cache status at the j-th node at time t, i.e., a list of cached content;

L={($j_1$,$j_2$), $j_1$,$j_2 \in N$}—is the network link set, where ($j_1$,$j_2$) is the link from node $j_1$ to node $j_2$;

b(i,j,t)—is the link capacity of (i,j), which is a time varying function;

B(i,j,t)—is the link status of (i,j) at time t, which is a list of transmitting content;

R($t_0$)=[$r_q$, q=1 . . . Q]—is the request set, which represents all requests made by clients to the content server by time t=$t_0$, where:

$r_q$=($m_q$, $d_q$, $u_q$)—is a request represented by content ID, due time and request client ID, and $m_q$—is a content ID with a content size |$m_q$| and a real-time streaming rate ||$m_q$|, $d_q$—is a due time for request $r_q$, and $u_q$—is the client ID for the client who made the request, from which the geographical location can be identified;

S($t_0$)={$s_q$($j_1$,$j_2$), ($j_1$,$j_2$)∈L}—is the scheduling set for the request set R($t_0$), where:

$s_q$($j_1$,$j_2$)—is the schedule (starting) time for request $r_q$ to be transported on ($j_1$,$j_2$), this is initialized to a value of 0; and $e_q$($j_1$,$j_2$)—is the schedule (ending) time for request $r_q$ to be transported on ($j_1$,$j_2$); and if the requested content is transmitted at the rate of ||$m_q$||, then $e_q$($j_1$,$j_2$)=$s_q$($j_1$,$j_2$)+|$m_q$|/||$m_q$||; and Normalized rate $v^*_q(t)$ of request $r_q$, where:

$$v^*_q(t)=\|m_q\|/(d_q-t). \quad (1)$$

In step 205 of FIG. 3, for each client request at time, $t_0$, in the request set R($t_0$), content server 20 calculates the normalized rate in accordance with equation (1), above. In step 210, content server 20 sorts the client requests in descending order of their calculated normalized rates to provide a sorted client request list. In step 215, content server 20 schedules the content for delivery in accordance with the order shown in the sorted client request list. Referring now to FIG. 4, a more detailed flow chart of step 215 is shown. Steps 255 through 275 of FIG. 4 are performed for each request, $r_q$, in the request set R($t_0$) in accordance with the sorted client request list determined in step 210 of FIG. 3. As a result, the schedule for a particular request $r_q$, {$s_q$(j,k), (j,k)∈L}, is made based on the previously made scheduling vectors {$s_x$(j,k); x=0, . . . , q−1}. In particular, in step 255 of FIG. 4, content server 20 selects the next request, $r_q$=($m_q$, $d_q$, $u_q$), for scheduling from the sorted client request list. In step 260, content server 20 identifies a set of servers $H_q$ that are available for sourcing the requested content for the request, $r_q$, where the set of servers includes at least one server, e.g., content server 20. (The ability for a content server to identify a set of servers available to source content for a client request is known in the art and not described herein.) In this set of servers, $H_q$, each server i has $m_q \in M_i(t_i)$, a source of content $m_q$ for request $r_q$, where $t_i$=max[$s_p$(j,i), p<q], the last time cache on server i got updated. In step 265, content server 20 finds the shortest path that provides the earliest delivery time of the requested content $m_q$ to destination $u_q$. For example, content server 20 uses a multi-source shortest path algorithm (e.g., Dijkstra's algorithm as known in the art) to find the shortest path from any server i∈$H_q$ to $u_q$. In step 270, content server 20 finds the schedule {$s_q$(j,k), (j,k)∈L} and update cache [$M_i$(t), i∈N] for links and servers on the selected path, respectively, applying constraints on link capacity and cache capacity as known in the art. (It should be noted that if max[$s_q$(j,k), (j,k)∈L]>$d_q$, then the scheduling attempt has failed to find a scheduling set for R($t_0$) and the process aborts.) Finally, in step 275, a check is made if all requests have been processed or not, i.e., does q=Q. If there are more requests to schedule, i.e., q<Q, the value of q is incremented, i.e., q=q+1, and execution returns to step 255 for the next request in the sorted client request list. However, if all requests have been scheduled, then execution ends.

Figure 5:
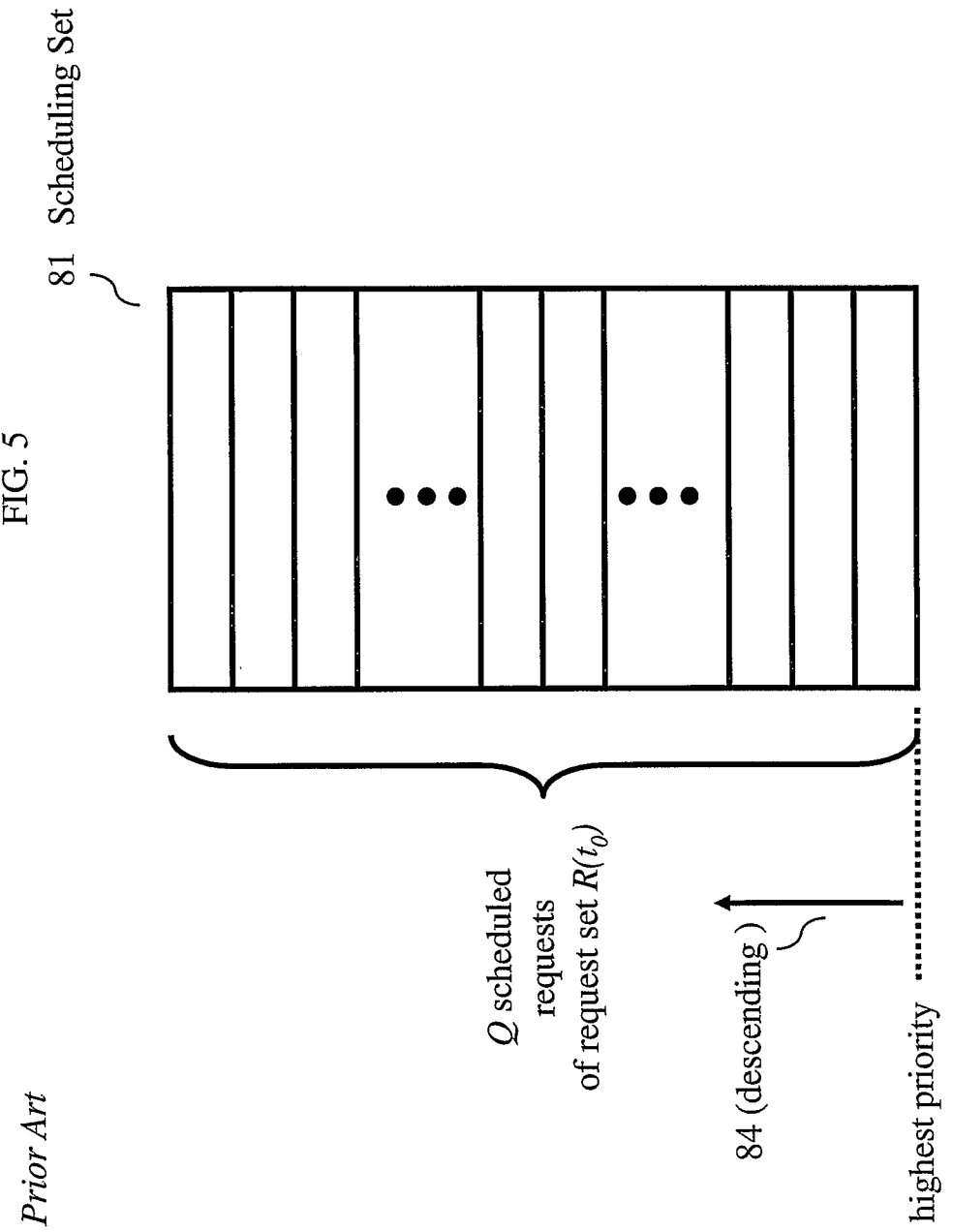

As a result of scheduling the requests in request set R($t_0$), content server 20 creates a scheduling set for delivering the requested content. An illustrative representation of a scheduling set 81 for Q requests at time, $t_0$, is shown in FIG. 5. Content server 20 will then proceed to deliver content in accordance with scheduling set 81, where the individual requests have been prioritized in terms of the calculated normalized rate as represented by arrow 84, which indicates the direction of descending order.

Figure 6:
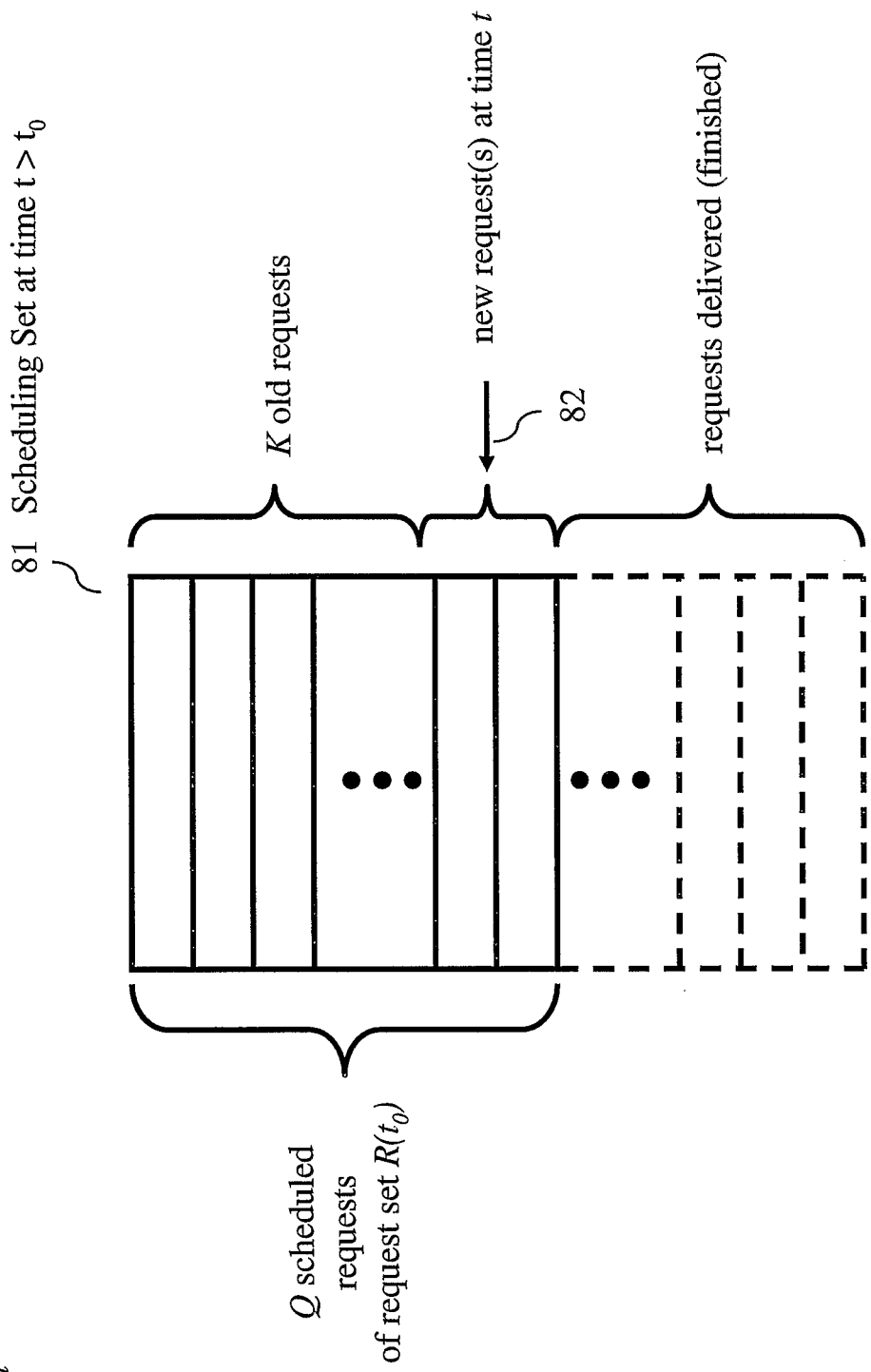

However, after time $t_0$, new client requests may arrive at a time, t. In addition, at this time, t, content server 20 may have finished delivery of some of the previously requested content, while the remaining client requests are still pending, i.e., are "old." In terms of the one, or more, new requests, some of them may have an earlier due time, or a larger requested file size than some of the old requests. As such, it may be the case that the normalized rates of one, or more, of the new requests at time t may be greater than some of the old requests. In order to maximize the number of requests that can be served by content server 20, the K old requests, together with any new requests at the time, t, are rescheduled using the NREDF process described above. Hence, a new request set at time t, R(t), is determined and the process illustrated in FIGS. 3 and 4 is repeated to yield a new scheduling set 83 for delivery of the content. This is illustrated in FIG. 6, where one, or more, new requests 82, have been scheduled, and there are still K old requests pending in the new scheduling set 83. For illustration purposes only, the delivery of previously scheduled client requests is shown in dashed line form in FIG. 6 since these have been dropped from the new scheduling set 83.

Unfortunately, as the client request rate increases, content server 20 begins to spend more and more time just computing the normalized rates and rescheduling old requests instead of actually delivering content. Thus the computation time required to admit new requests increases proportionally. This behavior jeopardizes the scalability of the NREDF approach for serving large numbers of clients. Therefore, and in accordance with the principles of the invention, a content server using a Normalized Rate Earliest Delivery First (NREDF) scheduler limits the number of old requests that are rescheduled to a threshold value.

Figure 7:
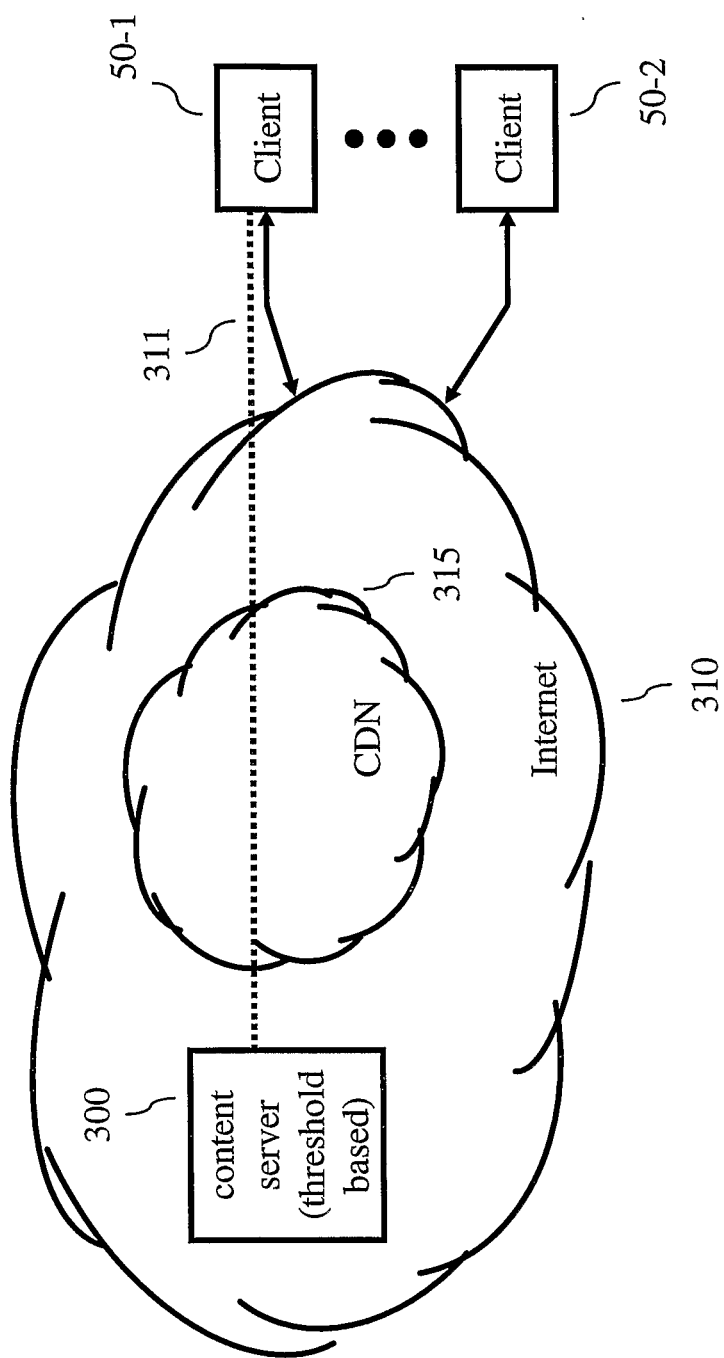
FIG. 7 shows an illustrative block diagram of a content delivery system in accordance with the principles of the invention.

Referring now to FIG. 7, an illustrative content delivery system in accordance with the principles of the invention is shown. The content delivery system comprises a content server 300, a communications network 310 and one or more clients, as represented by client 50-1 and 50-2. Content server 300, client 50-1 and client 50-2 are representative of stored-program-control-based processor platforms. For example, client 50-1 may be a desktop microprocessor-based personal computer and client 50-2 may be a cellular telephone; while content server 300 is a multi-processor-based (high performance) server. Illustratively, communications network 310 is representative of the Internet and comprises both switched and non-switched facilities as known in the art and includes, e.g., routers, edge node devices, etc. (all not shown in FIG. 7). In this example, and as can be observed from FIG. 7, content server 300 is represented as being located somewhere on the Internet with an associated Internet Protocol (IP) address (not shown). In addition, and as illustrated in FIG. 7, communications network 310 may also comprise a content delivery network (CDN) 315. Other than the inventive concept, a CDN is an overlay network (public or private) designed to securely deliver content from content servers (providers) to clients, while reducing costs and increasing client (end-user) speeds as known in the art. As such, other servers in the CDN may also be able to source requested content under the control of content server 300. The format of this content may be static content (e.g., web site content, files) or dynamic content (i.e., quickly changing content) and/or streaming audio/video. In the context of FIG. 7, clients 50-1 and 50-2 send requests for content to content server 300. In response to these requests, and in accordance with the principles of the invention, content server 300 schedules delivery using a Threshold-Based Normalized Rate Earliest Delivery First (TB-NREDF) scheduler. The TB-NREDF scheduler imposes a threshold value, or limit, on the number of rescheduling requests. Thus, content server 300 has the ability to limit rescheduling overhead, which also allows the content server to tradeoff scalability against system performance. In accordance with the TB-NREDF scheduling process, content server 300 causes the requested content to be delivered to the respective client via a path through the communications network. For example, content, e.g., a file, requested by client 50-1 is provided to client 50-1 via illustrative path 311, which, in this example, also traverses CDN 315. Path 311 represents any facilities and devices of communications network 10 through with the requested content is conveyed to client 50-1.

Figure 8:
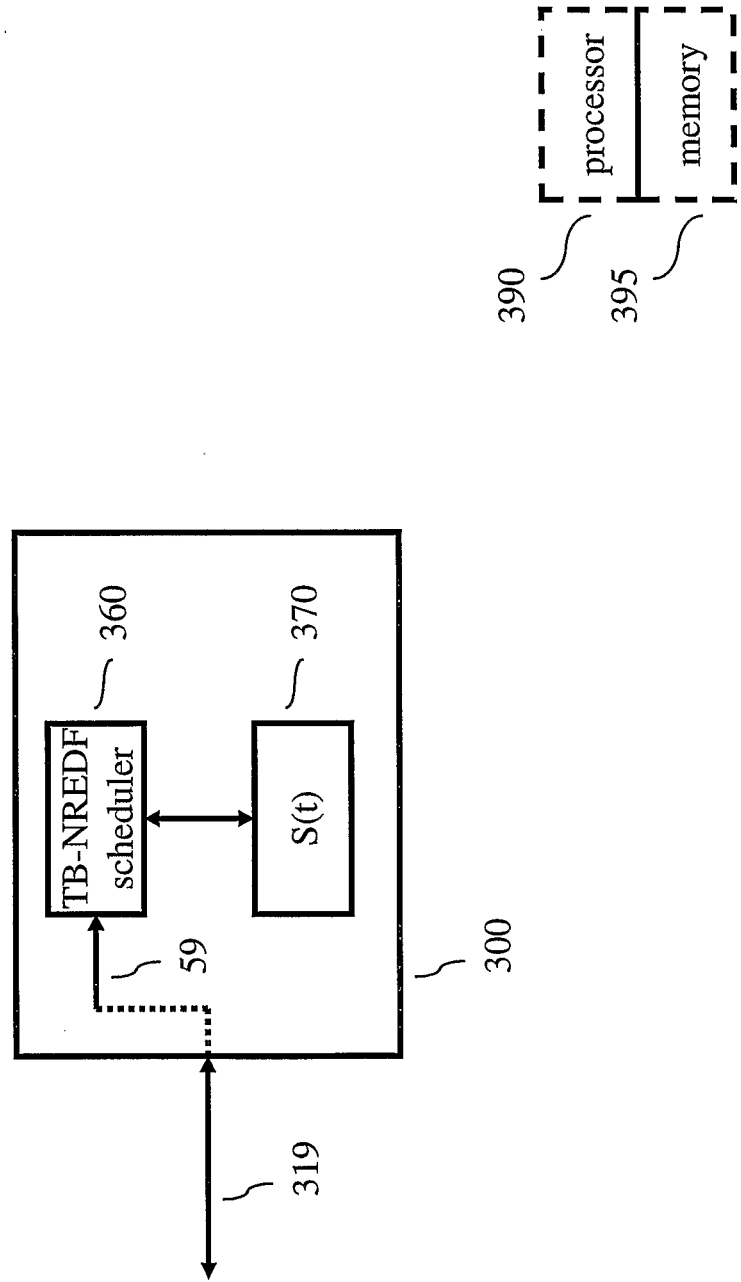
FIG. 8 shows an illustrative block diagram of a content server embodying the principles of the invention.

A high-level block diagram of content server 300 in accordance with the principles of the invention is shown in FIG. 8. Illustratively, content server 300 is a software-based processor as represented by processor 390 and memory 395 shown in the form of dashed boxes in FIG. 8. In this context, computer programs, or software, are stored in memory 395 for execution by processor 390. The latter is representative of one or more stored-program control processors and does not have to be dedicated to the TB-NREDF scheduler function, e.g., processor 390 may also control other functions of content server 300. Memory 395 is representative of any storage device, e.g., random-access memory (RAM), read-only memory (ROM), etc.; may be internal and/or external to processor 390; and is volatile and/or non-volatile as necessary. Content server 300 receives client requests 59 via connection 319, which couples content server 320 to Internet 310. In accordance with the principles of the invention, content server 300 comprises a TB-NREDF scheduler 360, which processes the received client requests 59 and generates a scheduling set, S(t), 370 for providing the requested content to the requesting clients.

Figure 9:
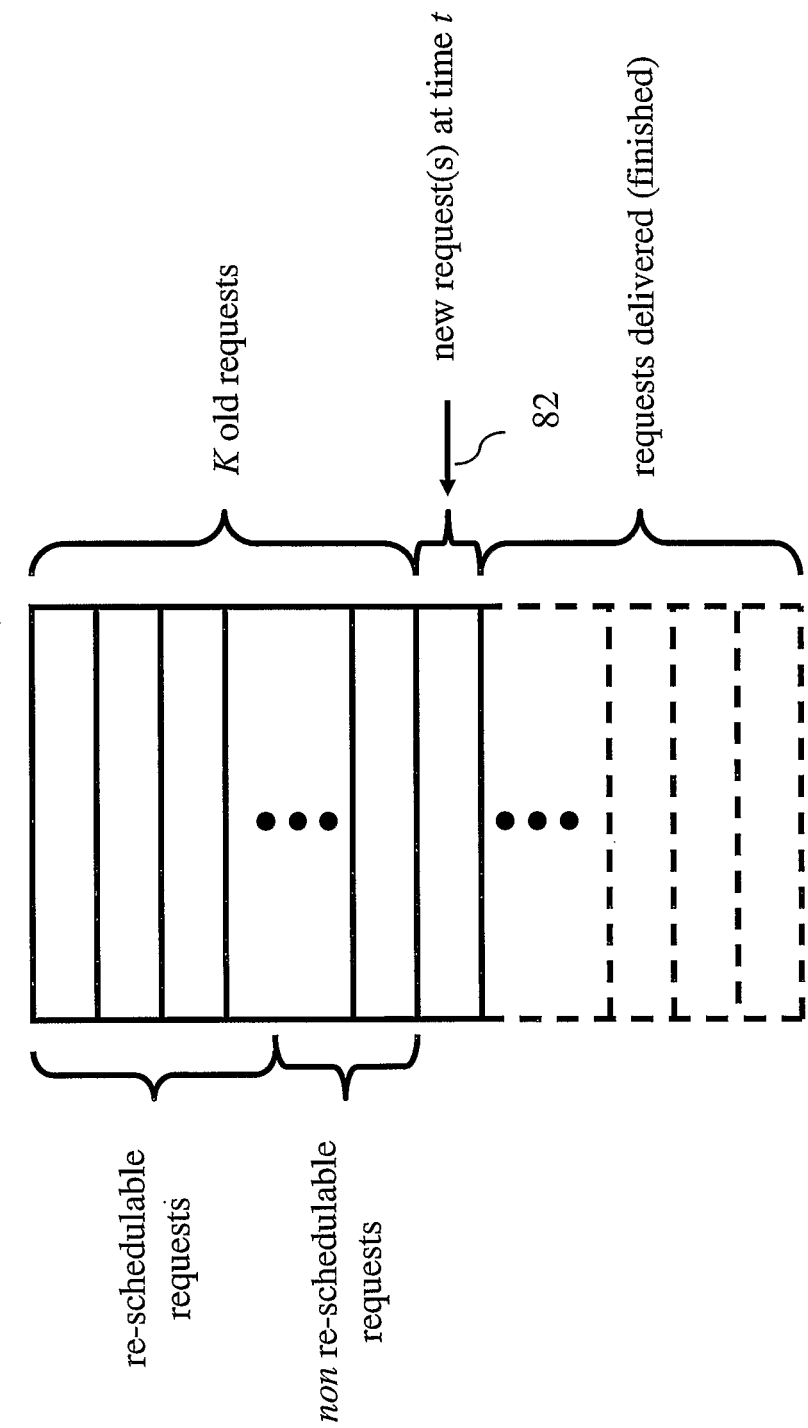
FIG. 9 shows an illustrative scheduling set in accordance with the principles of the invention.

Initially, at a time, $t_0$, content server 300 schedules requests for delivery in accordance with the NREDF process described in the flow charts of FIGS. 3 and 4, above. However, once an initial set of requests has been scheduled, and in accordance with the principles of the invention, content server 300 limits the number of rescheduling requests. For example, at a time, t, one, or more, new requests 82 have arrived and K old requests remain to be delivered. The Threshold-Based Normalized Rate Earliest Delivery First (TB-NREDF) process defines a look-back threshold, T, which represents the maximum number of old requests that are going to be rescheduled. As such, the TB-NREDF approach reschedules at most T old requests, where T<K. Thus, the schedules for the remaining K-T old requests are unchanged. This is illustrated in FIG. 9 for a scheduling set 381 at a time, t, where t>$t_0$. Particular values for T can be determined empirically depending upon the particular system.

Figure 10:
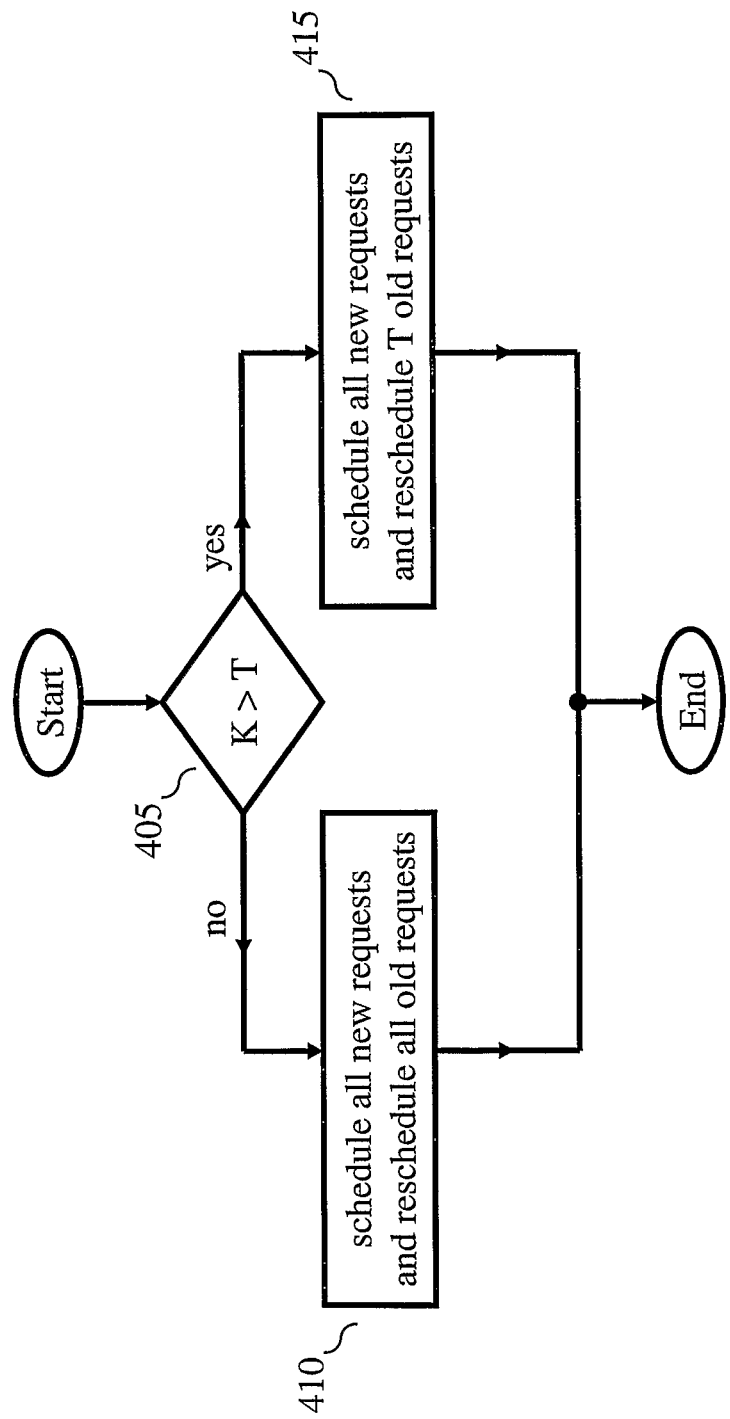
FIG. 10 shows an illustrative flow chart for use in a content server in accordance with the principles of the invention.

An illustrative flow chart for a TB-NREDF process in accordance with the principles of the invention is shown in FIG. 10. In step 405, TB-NREDF scheduler 360 determines if the total number of all old requests, K, at a time, t, exceeds a threshold value, T. If the total number of all old requests, K, does not exceed the threshold value; T, then, in step 410, TB-NREDF scheduler 360 schedules all new requests at time, t, (i.e., those client requests that have not yet been scheduled) and reschedules the total number of all old requests, K. However, if the total number of all old requests, K, at time, t, does exceed the threshold value T, then, in step 415, TB-NREDF scheduler 360 schedules all new requests at time, t, and reschedules T of the old requests. As a result, K−T of the old requests are not rescheduled.

Figure 11:
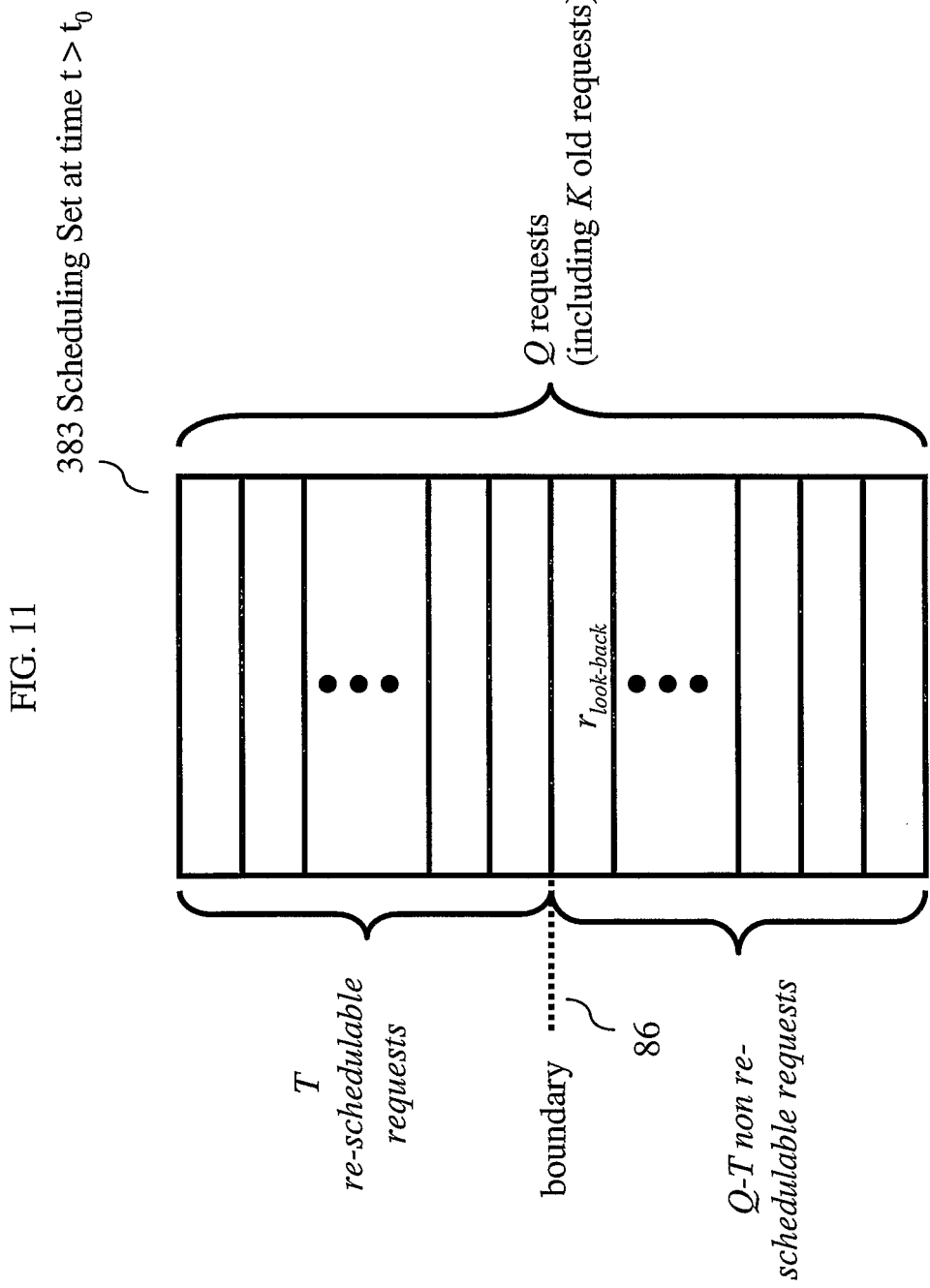

Another illustrative embodiment in accordance with the principles of the invention is shown in FIGS. 11, 12 and 13. Again, it is assumed that at a time, $t_0$, an initial set of requests, $R(t_0)$, has been scheduled for delivery resulting in an associated scheduling set. At a subsequent time, t, K old requests still remain and one, or more, new requests have arrived. The total number of requests in the request set R(t) is equal to Q, which is equal to the number of new requests plus the K old requests. In this example, content server 300 uses two additional parameters: $r_{look-back}$, and $STATE_{look-back}$. The parameter $r_{look-back}$ is defined to be that request that represents the boundary in the scheduling set beyond which old requests will be rescheduled, i.e., this is referred to herein as the look-back request. The request below the look-back request are defined as non re-schedulable requests; while the requests above the look-back request are defined as re-schedulable requests. Re-schedulable requests will be rescheduled together with new requests upon their arrival; while non re-schedulable requests' schedules are fixed, and they won't be rescheduled again. A NULL value for the parameter $r_{look-back}$ means that no look-back request has been set; while a non-NULL value for this parameter represents that a look-back request has been set. In comparison, the parameter $STATE_{look-back}$ is defined to be the associated look-back system state. In particular, the parameter, $STATE_{look-back}$, contains the states of the links and edge servers after $r_{look-back}$ is executed. Hence $STATE_{look-back}=\{\{c_j\}, \{C_j\}, \{b(i,j)\}, \{B(i,j)\}\}$ (defined earlier).

Turning now to FIG. 11, this figure illustrates a scheduling set 383 at time t. As can be observed from FIG. 11, one of the requests is designated as the $r_{look-back}$, which delineates a boundary 86 between those requests that will not be rescheduled and those old requests that will be rescheduled. Another illustrative flow chart for a TB-NREDF process in accordance with the principles of the invention is shown in FIG. 12. In step 505, TB-NREDF scheduler 360 marks any new requests as re-schedulable requests. In step 510, TB-NREDF scheduler 360 constructs a request set R(t) that includes all re-schedulable requests. In step 515, TB-NREDF scheduler 360 determines the current value for $r_{look-back}$. If the value for the parameter $r_{look-back}$ is NULL, this means that no look-back request has been set. In this case, the TB-NREDF process reverts back to ordinary NREDF and, in step 530, TB-NREDF scheduler 360 schedules all new requests at time, t, (i.e., those client requests that have not yet been scheduled) and reschedules the total number of all old requests, K. However, if the value for the parameter $r_{look-back}$ is not NULL, then, in step 520, TB-NREDF scheduler 360 determines if the designated look-back request has been delivered, i.e., is its service finished. If the designated look-back request has already been delivered then all new requests are scheduled and all old requests are rescheduled in step 530. It should be noted that since the designated look-back request has finished, the number of un-finished old requests will be less than T. On the other hand, if, in step 520, TB-NREDF scheduler 360 determines that the designated look-back request has not finished then TB-NREDF scheduler 360 processes the request set. In particular, in step 525, TB-NREDF scheduler 360 installs $STATE_{look-back}$ as the current system state in order to start at request $r_{look-back}$; and, in step 530, TB-NREDF scheduler 360 schedules all new requests at time, t, and reschedules T of the old requests. As a result, K-T of the old requests are not rescheduled.

As further illustration of the flow chart of FIG. 12, pseudo-code is shown in FIG. 13. It can be observed from steps 13, 14 and 15 of the pseudo-code of FIG. 13 that if the total number of requests, Q, (new requests plus old requests) is greater than the threshold value T, and the current request value, q, is less than, or equal to (Q–T) then a request is designated as the look-back request in step 14 and the corresponding state is stored in step 15.

As described above, a content server bounds the number of rescheduling requests—thus providing the ability to server a higher client request rate. This was illustrated in the description above in the context of a content server that uses a TB-NREDF process. In this example, a content server using the TB-NREDF process provides the ability to server a higher client request rate than a content server using the unbounded NREDF process illustrated in FIGS. 1-6. However, it should be noted that the TB-NREDF process may degrade system performance by admitting fewer requests than the NREDF process since some old requests with a smaller normalized rate than a new request may not be rescheduled. Regardless, TB-NREDF enables a content server to limit rescheduling overhead, which also allows the content server to tradeoff scalability against system performance.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied in one or more integrated circuits (ICs). Similarly, although shown as separate elements, any or all of the elements may be implemented in a stored-program-controlled processor, e.g., a digital signal processor, which executes associated software, e.g., corresponding to one or more of the steps shown in, e.g., FIGS. 10, 12 and 13, etc. Further, the principles of the invention are applicable to other types of communications systems, e.g., satellite, Wireless-Fidelity (Wi-Fi), cellular, Bluetooth etc., and combinations thereof. For example, a distributed communications network may include both wired and wireless connections. Indeed, the inventive concept is also applicable to stationary or mobile content servers. It is therefore to be understood that numerous modifications may be made to the illustrative embodiments and that other arrangements may be devised without departing from the spirit and scope of the present invention as defined by the appended claims.

The invention claimed is:

1. A method performed by a processor-based system for scheduling delivery in response to requests for one or more services, the method comprising:
   receiving at least one new request for the service;
   scheduling the at least one new request for delivery;
   determining a number of old requests, wherein the at least one new request and any old requests form a request set;
   determining if a look-back request has been set in the request set;
   if no look-back request has been set, then determining a scheduling set such that all old requests are rescheduled; and
   if a look-back request has been set and the look-back request has not been delivered, then rescheduling at most a threshold value of old requests for delivery.

2. The method of claim 1, wherein the scheduling step performs threshold-based Threshold-Based Normalized Rate Earliest Delivery First (TB-NREDF).

3. The method of claim 1, wherein the service delivers content.

4. The method of claim 3, wherein the content is a file.

5. The method of claim 3, wherein the content is streaming video.

6. Apparatus for use in providing services to requesting clients, the apparatus comprising:
   a processor for providing a scheduling set for delivering services to requesting clients by scheduling at least one new request for the service and a number of old requests for delivery, wherein the processor (a) schedules the at least one new request for delivery, (b) determines a number of old requests, the at least one new request and any old requests forming a request set, (c) determines if a look-back request has been set in the request set, (d) if no look-back request has been set, determines a scheduling set such that all old requests are rescheduled, and (e) if a look-back request has been set and the look-back request has not been delivered, reschedules at most the threshold value of old requests for delivery; and
   a memory for storing the provided scheduling set.

7. The apparatus of claim 6, wherein the processor performs threshold-based Threshold-Based Normalized Rate Earliest Delivery First (TB-NREDF).

8. The apparatus of claim 6, wherein the services deliver content.

9. The apparatus of claim 8, wherein the content is a file.

10. The apparatus of claim 8, wherein the content is streaming video.

11. A non-transitory computer-readable medium having computer-executable instructions for a processor-based system such that when executed the processor-based system performs a method for scheduling delivery in response to requests for one or more services, the method comprising:
   receiving at least one new request for the service;
   scheduling the at least one new request for delivery;
   determining a number of old requests, wherein the at least one new request and any old requests form a request set;
   determining if a look-back request has been set in the request set;
   if no look-back request has been set, then determining a scheduling set such that all old requests are rescheduled; and
   if a look-back request has been set and the look-back request has not been delivered, then rescheduling at most a threshold value of old requests for delivery.

12. The computer-readable medium of claim 11, wherein the scheduling step performs threshold-based Threshold-Based Normalized Rate Earliest Delivery First (TB-NREDF).

13. The computer-readable medium of claim 11, wherein the one or more services deliver content.

14. The computer-readable medium of claim 13, wherein the content is a file.

15. The computer-readable medium of claim 13, wherein the content is streaming video.

* * * * *